(No Model.)

C. F. WINKLER.
ARMATURE.

No. 411,629. Patented Sept. 24, 1889.

WITNESSES,
Raymond A. Barnes
Wm A. Rosenbaum

INVENTOR.
Charles F. Winkler.

ATTORNEY.

UNITED STATES PATENT OFFICE.

CHARLES F. WINKLER, OF HOOSICK FALLS, NEW YORK.

ARMATURE.

SPECIFICATION forming part of Letters Patent No. 411,629, dated September 24, 1889.

Application filed January 26, 1889. Serial No. 297,660. (No model.)

*To all whom it may concern:*

Be it known that I, CHARLES F. WINKLER, a citizen of the United States, residing in Hoosick Falls, in the county of Rensselaer and State of New York, have invented certain new and useful Improvements in Armatures, of which the following is a specification.

My invention has reference to armatures for dynamo-electric machines and motors. It relates particularly to the manner of applying or mounting the coils on the Siemens form of armature. The winding, instead of being the ordinary form of wire-winding, is formed of plates or strips of iron having some considerable width. The particular form is described in my application, No. 297,661, filed the 26th of January, 1889. Each coil is made up of several turns of the strip. It is desirable that the longest diameter of the coils be as short as possible, in order that the armature may not be unduly lengthened by the crossing of the coils at the ends. I accomplish this by bending the ends of each coil over and away from the shaft and against the head of the armature-drum. This shortens the coil and admits of another coil being adjusted over it. This latter in its turn is bent over to admit of the third coil being placed in position, and so on, the ends of each coil being bent over for the purpose described.

Figure 1:
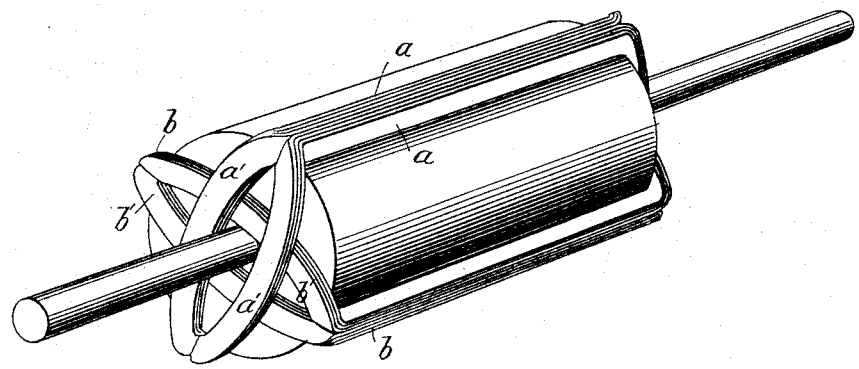
Figure 2:
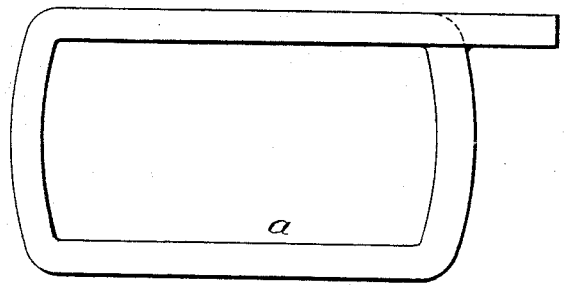
Figure 3:
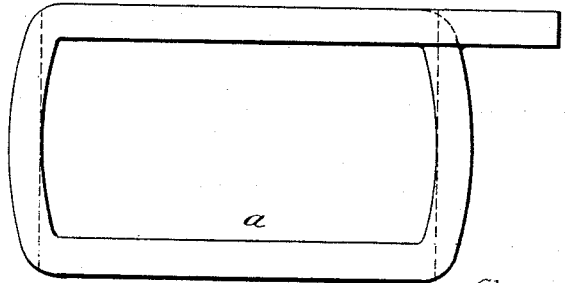

Referring to the drawings, Figure 1 represents a perspective view of a Siemens armature, showing two coils adjusted in accordance with my invention. Fig. 2 is a side view of a single coil; and Fig. 3 is the same, showing a dotted line indicating a different line of bending.

The coils are represented by $a$ and $b$, and the bent ends by $a'$ and $b'$.

Having now described my invention, I claim—

1. An armature for dynamo-electric machines or motors, the coils or sections being formed of flat strips of metal wound on edge, and the ends of said coils or sections being bent over toward or against the heads of the armature, substantially as described.

2. An armature for dynamo-electric machines or motors made up of a series of coils or sections which lay over or cross each other at the ends or heads of the armature, the said coils consisting of flat metal strips wound on edge and having their ends, which cross each other, bent over laterally against the heads or ends of the armature to shorten their diameter, for the purpose described.

3. A Siemens armature for dynamo-electric machines or motors, whose winding consists of flat metal strips wound on edge, that portion of the winding which passes over the heads or ends of the armature being turned over or bent flat against said ends, for the purpose described.

In witness whereof I have hereunto signed my name in the presence of two subscribing witnesses.

CHARLES F. WINKLER.

Witnesses:
 WILLIAM L. HALL,
 HENRY S. PRUYN.